UNITED STATES PATENT OFFICE.

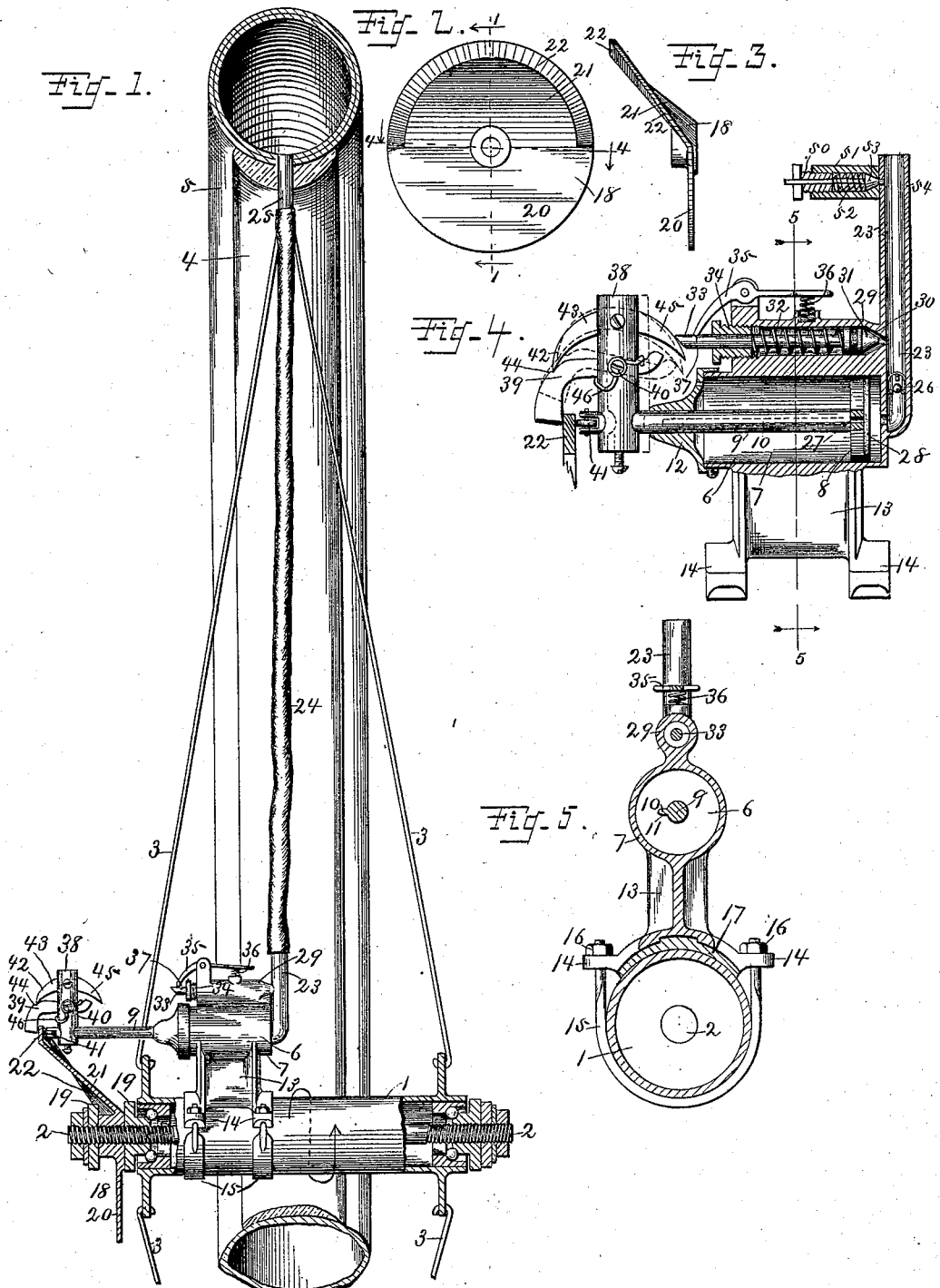

THOMAS M. JENKS, OF GALESBURG, ILLINOIS, ASSIGNOR OF ONE-FOURTH TO EDWARD W. JENKS, OF CHICAGO, ILLINOIS.

AUTOMATIC PUMP FOR PNEUMATIC TIRES.

SPECIFICATION forming part of Letters Patent No. 571,001, dated November 10, 1896.

Application filed June 12, 1896. Serial No. 595,297. (No model.)

*To all whom it may concern:*

Be it known that I, THOMAS M. JENKS, a citizen of the United States, residing at Galesburg, in the county of Knox and State of Illinois, have invented certain new and useful Improvements in Automatic Pumps for Pneumatic Tires, of which the following is a specification.

My present invention relates to improvements in automatic pumps for pneumatic tires.

The leading objects of my invention are to provide means for imparting positive movement in both directions to the pump-piston; to provide improved means for automatically controlling the pressure of air in the tire; to provide an automatic trip mechanism for throwing the air-pump out of gear with its operating mechanism, and in this connection further providing means for throwing the pump out of gear with said actuating mechanism when the air-pressure in the tire has reached different predetermined limits; to provide means for throwing the air-pump into gear with its actuating mechanism, and to provide means whereby the automatic trip mechanism may be dispensed with and the means for actuating the pump-piston with great velocity be retained, in connection with an adjustable valve for regulating the air-pressure in the tire.

Other objects of my invention are hereinafter described, and the constructions and combinations for carrying out the different objects of the invention, and in which my improvements consist, are all hereinafter described and made the subject-matter of claims hereto appended.

Mechanism embodying the preferred construction, arrangement, disposition, and combination of the different parts and adjacent parts of an ordinary bicycle-wheel in which my improvements are incorporated are illustrated in the accompanying drawings, in which—

Figure 1 is a sectional elevation of the pneumatic tire and the wheel-rim, a side elevation of the pump, sectional elevation of the pump-operating cam in line 1 1 in Fig. 2, and side elevation of the wheel-hub, partly in section; Fig. 2, a side elevation of the pump-operating cam as seen from its outer side; Fig. 3, a side or edge elevation of the cam shown at Fig. 2; Fig. 4, an enlarged detail showing the pump, its operating parts, the trip-valve casing, and the pump-actuating cam in sectional plan in line 4 4 in Fig. 2, and other adjacent parts in plan, and in positions as they would appear if the wheel was revolved nearly one-fourth of a revolution from its position shown at Fig. 1, and in the direction shown by the arrow on the wheel-hub at same figure; Fig. 5, a sectional elevation in line 5 5 in Fig. 4.

The hub 1, axle 2, spokes 3, rim 4, and pneumatic tire 5 are parts of an ordinary bicycle-wheel to which my improvements are shown as applied in the best way at present known to me. It will be understood, however, that the improvements as they are shown or with slight mechanical modifications may be readily applied to the wheel or wheels of any vehicle having a pneumatic tire or tires.

The air-pump 6 is of ordinary construction, having a cylinder 7, piston 8, and piston-rod 9. The piston-rod is alined or prevented having rotary motion, while permitted to move freely endwise of itself, by a ledge 10 thereon, which ledge slides in a groove 11 in the pump-head 12. The pump, in so far as my other improvements are concerned, may be supported or mounted on the wheel-hub in any desired manner. I have shown, however, a novel method of fixing such pumps to hubs, by means of which they may be readily fixed to new hubs or to hubs already in use and of different construction and different sizes with the same attaching devices. For this purpose a standard 13 depends from the lower side of the pump-barrel and has arms 14 projecting laterally from each of its sides. The under sides of these arms are concave in form to fit a medium-sized hub and have holes through which the ends of flexible straps 15 pass. The straps 15 being flexible will adapt themselves to hubs of different sizes, and are tightened up to fix the pump firmly to the hub by means of nuts 16. Blocks 17 are inserted between the arms 14 and the pump to make a fit when the hub is considerable smaller or larger than a medium size.

The non-rotatable actuating-cam 18 consists of a disk fixed at its central part on the non-rotatable axle 2 by nuts 19. This cam may be formed of a disk, as shown, or it may be formed of open-work, its essential features being that one half or side 20 thereof, or the outer peripheral part of said one-half part, is entirely in a plane at right angles to the axis of the wheel, while the other one half or side 21 is inclined at an angle to said plane, as shown best at Figs. 1 and 3. The inclined portion 21 of said cam has an outwardly-turned flange 22, which is necessarily turned outwardly, most at its mid-length part and with dimishing inclinations toward both of its ends. When the wheel is revolved, the pump is revolved or carried around therewith, and the peripheral part of the disk 18 then serves as a fixed cam-track, which operates the pump-piston positively in both directions, as hereinafter described, while the piston and parts connected therewith are in contact with its inclined part 21 and holds the piston at rest while said piston and other parts are engaged with or in contact with its other side 20, as the outer end of the pump-piston is carried around in an orbital path coincident with said circular cam-track.

A tube 23 communicating with the air-discharging end of the pump-cylinder is connected by means of a flexible tube 24 with the ordinary tube 25, which communicates with the interior of the pneumatic tire 5. If preferred, the tube 23 may be extended to alone make the connection between the pump and pneumatic tire. An eduction-valve 26 permits the air to flow from the pump to the pneumatic tire and prevents the air returning to the pump. Air enters the pump at the annular opening in the pump-head around the piston-rod and passes through the opening 27 in the piston and past the piston-valve 28 in an ordinary manner.

Either integral with the pump-cylinder or otherwise fixed thereto, if preferred, is a smaller cylinder 29, with its interior tapered at one end 30, where it communicates with the interior of the tube 23. A conical pointed valve 31 seats on the valve-seat 30 and is normally held thereagainst by a helical spring 32, which encircles its stem 33 between the valve 31 and the cylinder-head 34. The head 34 is screw-threaded into the cylinder 29. By adjusting the head 34 the tension of the spring 32 can be adjusted, and thereby hold the valve 31 with a greater or lesser degree of force against its seat, so that a greater or lesser degree of air-pressure, as may be desired, may be maintained in the pneumatic tire before the back pressure thereof will force the valve 31 from its seat, and thus thrust or force the valve-stem 33 outwardly, as shown at Fig. 4. When the valve-stem 33 is thrust outwardly, as above described, the end of the dog 35 will, by the spring 36 under its other end, be forced into engagement with the notch 37 in the stem 33, and thus lock and hold the stem 33 and valve 31 in the positions shown at said figure, and in which positions the valve-stem 33 will act as a trip to throw the air-pump out of gear connection with the cam 18, as will now be described.

A standard 38, rigidly fixed to the piston-rod 9, near the outer end thereof, has a follower or bent arm 39 seated in a slot therein and pivoted to said standard by a pivot-bolt 40 in such manner that the outer lower end of said follower will, when in its lowermost position, as shown by full lines at Figs. 4 and 5, contact with the outer side of the cam-track of the disk 18 directly opposite the antifriction-roller 41, journaled in the outer end of the piston-rod 9, and which is in contact with the other side of the cam-track. While the end of the pump piston-rod and the follower or bent arm 39 are in the positions last described in contact with and on opposite sides of the cam-track, said cam-track will act as a driver and the bent arm and piston-rod each act as a follower, the piston-rod to receive motion direct from one side of the cam-track to give it a forward throw and thrust it into the pump and the follower or bent arm 39 to receive motion direct from the other side of the cam-track to draw said bent arm or follower 39 in an opposite direction, whereby it will give a return throw in an outward or opposite direction to said piston. One end 42 of a dog 43, which is also pivotally mounted in a slot in the standard 38, engages with a notch 44 in the follower or bent arm 39 and holds the outer end of said arm down in its proper working position with reference to the cam-track. When the dog 43 is engaged with the notch in the follower or bent arm 39, as last described, its free end 45 is in such position (see full lines at Fig. 4) that it will come in contact with the outer end of the valve-stem 33 as the piston 8 nearly reaches the end of its throw toward the air-discharging end of the pump, and as the piston then completes its throw the standard 38 will be moved to the position shown by dot lines in said figure, and in so moving will thrust the end 45 of the dog 43 against the outer end of the trip or valve-stem, and thereby raise the other end of said dog free from the notch in the bent arm 39, and thus release said bent arm and permit the spring 46 to elevate the outer end of the follower or bent arm and hold said follower or arm in the position shown by dot lines at said figure. The follower or bent arm when elevated and held at its outer end, as last described, will in turn hold the dog 43 in the position shown by dot lines at same figure.

While the outer end of the follower or bent arm is, as described, held in the position shown by dot lines at Fig. 4, it will not contact with the cam-track, and hence the pump-piston will not be drawn outwardly and will cease to operate until the air-pressure in the pneumatic tire has diminished, when the operator, by slight pressure on the back end of the dog 35, can throw its other end out of engagement with the notch 37 in the valve-stem 33, and the pressure being, as it is, now removed, the valve 31 will slide back to its seat and the valve-stem be retracted, as shown at Fig. 1. Slight pressure by the hand of the operator on the end 42 of the dog 43 will now restore the bent arm 39 and said dog to their working positions. (Shown by full lines at Figs. 1 and 4.) The air-pump will then be again operated until the pressure in the pneumatic tire overcomes the force exerted by the spring 32, forces the valve 31 from its seat, and again trips the bent arm out of contact with the cam-track, and again stops the action of the pump when the air-pressure in the pneumatic tire has reached a point predetermined by adjustment of the head 34.

The effectiveness of my pump in inflating pneumatic tires of any kind arises to some extent from the construction of the cam for operating the pump, and from the fact that positive movement in both directions is given to the pump-piston by the cam and its auxiliary parts, such as the bent arm or follower 39. The construction of the cam is such that a one-half revolution of the wheel and of said cam will give both a forward and a return throw to the pump-piston, thus operating the pump-piston quickly and most effectively.

My improved means for operating the pump may be used with pumping attachments not having my tripping-valve. The pump, as shown, with the tripping-valve may also be used without using said tripping-valve, as follows: The valve 31 being to its seat and the stem 33 in its retracted position, as shown at Fig. 1, the nut 34 may be screwed inwardly to increase the pressure of the valve 31 against its seat to such an extent that it will resist a greater pressure than is desired in the pneumatic tire. Then the head 50 may be adjusted in the air-escape pipe 51, which communicates with the interior of the pipe 23, and thereby adjust the pressure of the spring against the conical valve 53, as desired, to prevent the air escaping through the opening 54 until said spring pressure is overcome. By this means any desired and predetermined pressure may be maintained in the pneumatic tire without using my improved means for tripping the pump out of gear with the cam-track and simply by allowing any excess of air-pressure to escape, as described, through the pipe 51.

It will be understood that the outer edge or peripheral part 22 of the one-half part 21 of the cam-disk 18 is oblique to the axis of said disk in opposite directions from the midlength part of its outer edge, one of said oblique edges being shown at Fig. 1 and the other at Fig. 3, so that when the wheel turns in either direction the forward one of said oblique parts will act on the follower or bent arm to draw the pump-piston outwardly and the rear one of said parts will act on the outer end of the piston to move said piston inwardly of the pump. By this means the outer edge or peripheral part of the one-half part 21 of the cam-disk gives both the forward and the return strokes to the pump-piston. It will also be understood that an ordinary swash-plate or cam-disk can be used with my improvements, in which a flat disk is fixed to the axle 2 obliquely or at an angle to said axle, so that it requires the action of the entire outer edge or peripheral part of said cam-disk to impart both the forward and the return throws to the pump-piston.

Having thus described my invention, what I claim as new, and desire to secure by Letters Patent, is—

1. In combination, a wheel and hub, an axle on which the hub rotates, an air-pump having a piston-rod with an extended outer end, a disk or cam-wheel fixed to the axle in such position that one of its sides will act on the outer end of the piston-rod, and a follower mounted on the piston-rod and adapted to engage the cam-wheel on its opposite side from its side engaged with the end of the piston-rod, substantially as described.

2. In combination, a wheel and hub, an axle on which the hub rotates, an air-pump having a piston-rod with an extended outer end, a disk or cam-wheel fixed to the axle, a standard fixed to the piston-rod, and a follower pivotally mounted on said standard and adapted to engage the cam-wheel on its opposite side from the piston-rod substantially as described.

3. In combination, a wheel and hub, an axle on which the hub rotates, an air-pump having a piston-rod with an extended outer end, a disk or cam-wheel fixed to the axle, a standard fixed to the piston-rod, a follower pivotally mounted on said standard, and a dog also pivotally mounted on said standard, and adapted to engage with a notch in the follower to lock or hold said follower in working position, substantially as described.

4. In combination a wheel and hub, an axle on which the hub rotates, an air-pump having a piston-rod with an extended outer end, a disk or cam-wheel fixed to the axle, a standard fixed to said piston-rod, a follower pivotally mounted on said standard, a dog also pivotally mounted on said standard, a pipe connecting the air-pump with the pneumatic tire, a cylinder communicating with the interior of said pipe, a valve in said cylinder, a spring holding it to its seat, and a valve-stem projecting from said cylinder and adapted to trip said dog and follower and thereby stop the action of the cam-disk on the air-pump, substantially as described.

5. In combination, a wheel and hub, an axle on which the hub rotates, an air-pump having a piston-rod with an extended outer end, a disk or cam-wheel fixed to the axle, a standard fixed to the piston-rod, a follower pivotally mounted on said standard, a dog also pivotally mounted on said standard, a pipe connecting the air-pump with the pneumatic tire, a cylinder communicating with the interior of said pipe, a valve in said cylinder, a spring, an adjustable head for regulating the tension of said spring, a valve-stem, and a spring-actuated dog for locking said valve-stem and valve, substantially as described.

6. In combination, a wheel and hub, an axle on which the hub rotates, an air-pump having a piston-rod with an extended outer end, a disk or cam-wheel fixed to the axle, a standard fixed to said piston-rod, a follower pivotally mounted on said standard, a dog also mounted on said standard, a pipe connecting the air-pump with the pneumatic tire, a cylinder communicating with the interior of said pipe, a valve in said cylinder, a spring, an adjustable head for regulating the tension of said spring, a valve-stem, a spring-actuated dog for locking said valve-stem, and an air-release comprising a short pipe communicating with the pipe leading from the pump to the tubular tire, a valve seated therein, a spring, and an adjustable head for regulating the tension of said spring, substantially as described.

7. In combination, the wheel, air-pump with extended piston-rod, cam-disk, a follower pivotally connected indirectly with said piston-rod, and a spring for holding the follower out of engagement with the cam-disk, substantially as described.

In testimony whereof I affix my signature in presence of two witnesses.

THOMAS M. JENKS.

Witnesses:
R. C. HUNT,
H. M. RICHARDS.